United States Patent [19]

Mitchell et al.

[11] 4,103,524

[45] Aug. 1, 1978

[54] THEFTPROOF STEERING WHEEL LOCK

[75] Inventors: Ronald A. Mitchell, 87 Wesson Ave., Quincy, Mass. 02169; William Augustus Bedford, Jr., Brockton, Mass.

[73] Assignee: Ronald A. Mitchell, Quincy, Mass.

[21] Appl. No.: 775,950

[22] Filed: Mar. 10, 1977

[51] Int. Cl.$^2$ ............................................. B60R 25/02
[52] U.S. Cl. ........................................ 70/209; 70/226; 70/237
[58] Field of Search ............... 70/209, 207, 224, 226, 70/225, 237, 175, 57, 14, 416–418, 423

[56] References Cited

U.S. PATENT DOCUMENTS

| 1,853,403 | 4/1932 | Briggs | 70/417 X |
| 3,334,501 | 8/1967 | Greenwald | 70/417 X |
| 3,462,982 | 8/1969 | Moore | 70/209 |
| 3,981,168 | 9/1976 | Coralli et al. | 70/417 |

FOREIGN PATENT DOCUMENTS

| 106,072 | 12/1966 | Denmark | 70/209 |
| 1,127,524 | 9/1968 | United Kingdom | 70/226 |

Primary Examiner—Roy D. Frazier
Assistant Examiner—William E. Lyddane
Attorney, Agent, or Firm—Dike, Bronstein, Roberts, Cushman & Pfund

[57] ABSTRACT

A theftproof automobile steering wheel lock comprising a rigid bar adapted to be attached diametrically to the steering wheel with one end at least extending beyond the rim of the wheel a sufficient distance so that rotation of the wheel in either direction is limited by engagement of the protruding end with an interior direction of the vehicle or operator.

10 Claims, 13 Drawing Figures

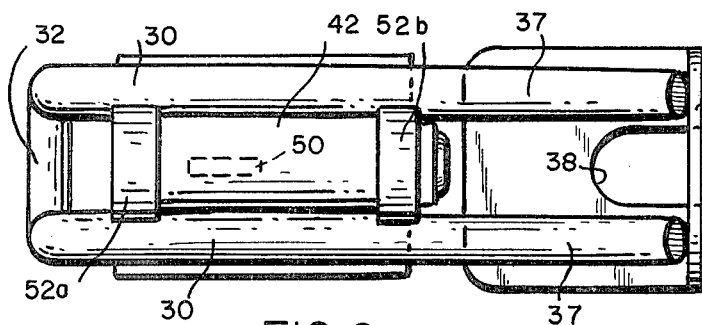
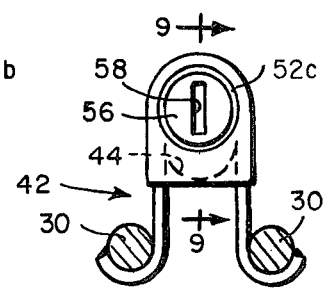
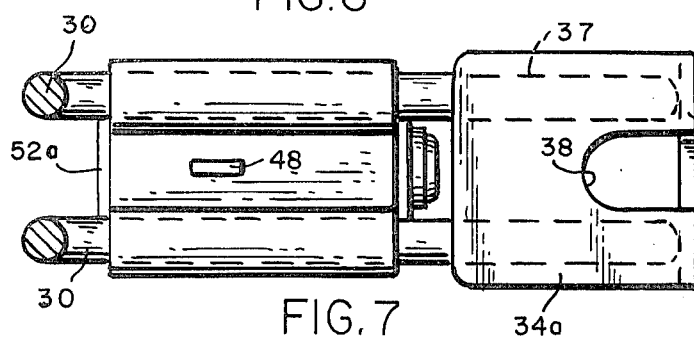
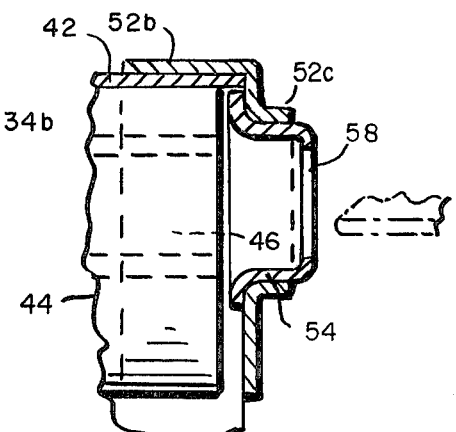
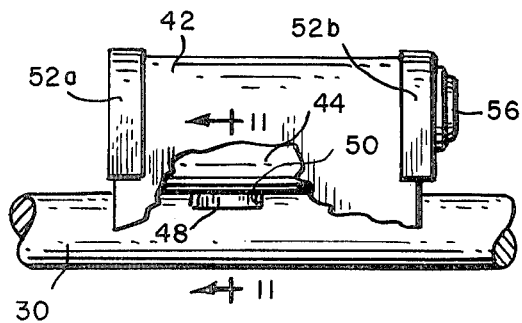
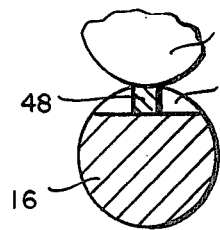
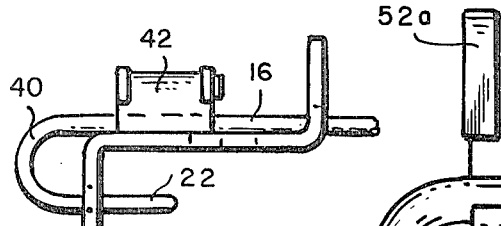
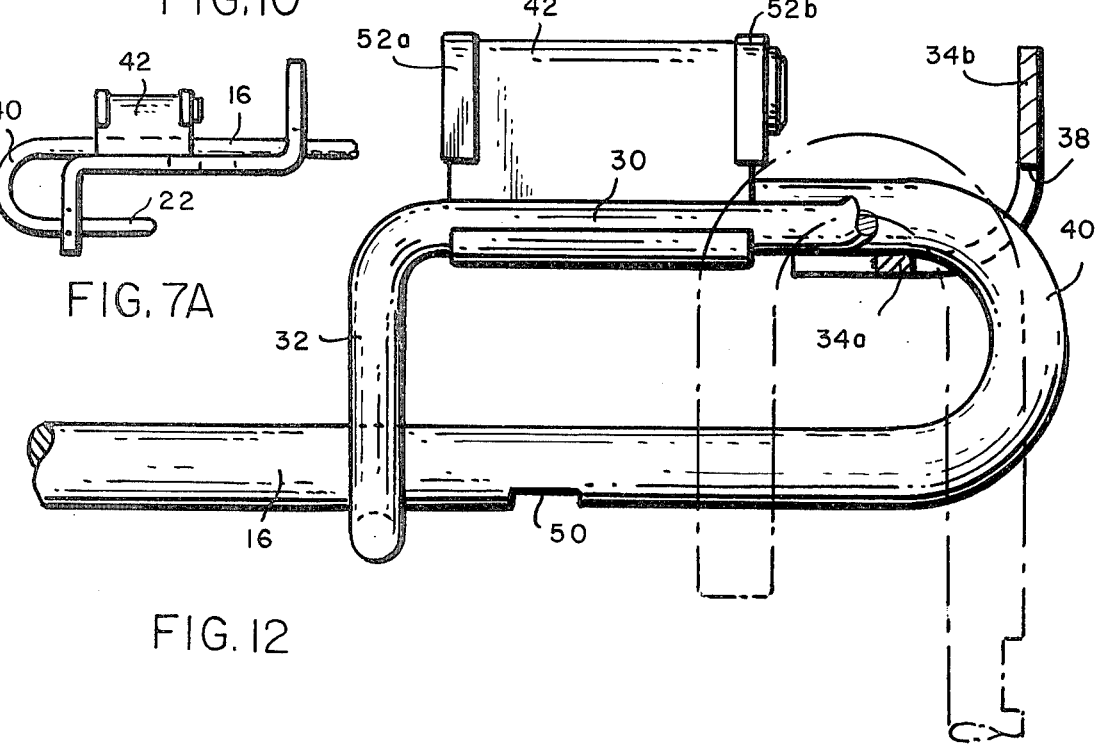

THEFTPROOF STEERING WHEEL LOCK

SUMMARY OF THE INVENTION

A steering wheel lock comprising a rigid elongate bar of greater length than the diameter of the steering wheel constructed and arranged to be attached diametrically across the wheel with one end at least projecting from the wheel a sufficient distance to have engagement with the interior of the vehicle or operator when the steering wheel is turned in either direction through a predetermined angular distance and thus to prevent free turning of the wheel and tamper-resistant locking means for securing the bar to the steering wheel. The means for attaching the bar to the wheel comprise longitudinally spaced hooks for receiving the rim of the steering wheel and a slider mounted on the bar for movement therealong to a position of engagement with the distal end of one of the hooks to confine the rim within the hook. A tamper-resistant lock locks the slider to the bar. In the preferred structure, one of the hooks is located at one end of the bar and the other hook is located intermediate the ends of the bar, the one hook being an integral portion of the bar bent double upon itself and the other hook a part welded to the bar. The slider contains a loop for receiving the distal end of the hook at one end of the bar and the lock assembly is mounted to the slider with its axis parallel to the bar and with its bolt perpendicular to the bar, the latter containing a notch for receiving the bolt when extended. The lock assembly contains a keyhole, the axis of which is parallel to the bar and a rigid guard is fixed to the slide opposite the keyhole at a distance slightly greater than the length of the key. The slider comprises a rod bent to provide spaced parallel portions with a depending loop at one end, an angle member fixed to the other end for engagement with the underside of the bar, a portion thereof containing an opening for slidingly receiving the bar, said portion constituting the aforesaid guard opposite the keyhole and a saddle fixed to the end adjacent the loop within which the lock assembly is secured and supported in sliding engagement with the top side of the bar.

The invention will now be described in greater detail with reference to the accompanying drawings, wherein:

FIG. 6 is a plan view of the locking slider;

FIG. 7 is a bottom view taken on the line 7—7 of FIG. 4;

FIG. 7A is an elevation of a modified slider;

FIG. 8 is a transverse view partly in section taken on the line 8—8 of FIG. 4;

FIG. 9 is a fragmentary section to larger scale taken on the line 9—9 of FIG. 8;

FIG. 10 is an elevation partly in section showing the engagement of the bolt with the locking bar;

FIG. 11 is a section taken on the line 11—11 of FIG. 10; and

FIG. 12 is an elevation illustrating the way in which the locking slider may be removed from the locking bar.

Figure 1:
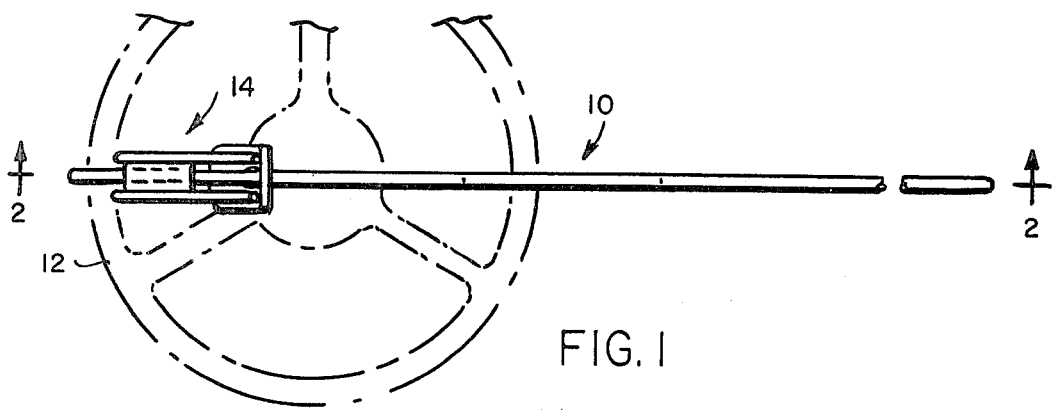
FIG. 1 is a plan view of the device attached diametrically to a steering wheel, said device comprising a lock bar and a locking slider.
Figure 2:
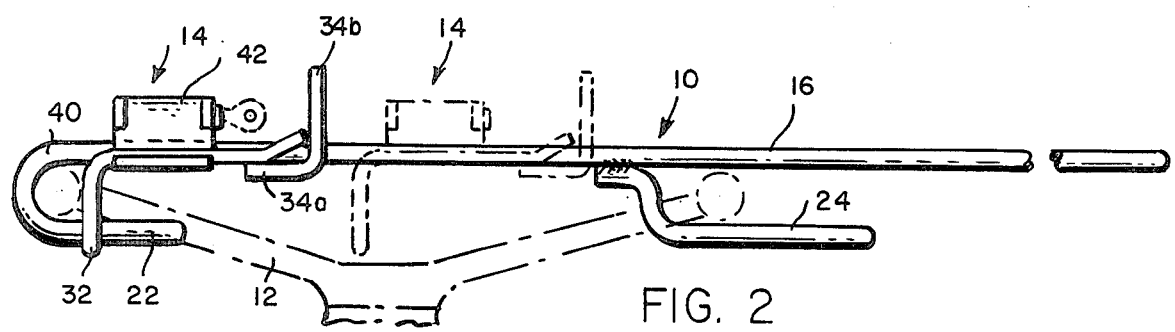
FIG. 2 is an elevation taken on the line 2—2 of FIG. 1.

Referring to the drawings, FIGS. 1 and 2, the device comprises essentially a rigid bar 10 which is adapted to be placed diametrically across a steering wheel 12 and to be secured thereto by a locking slide 14.

Figure 3:
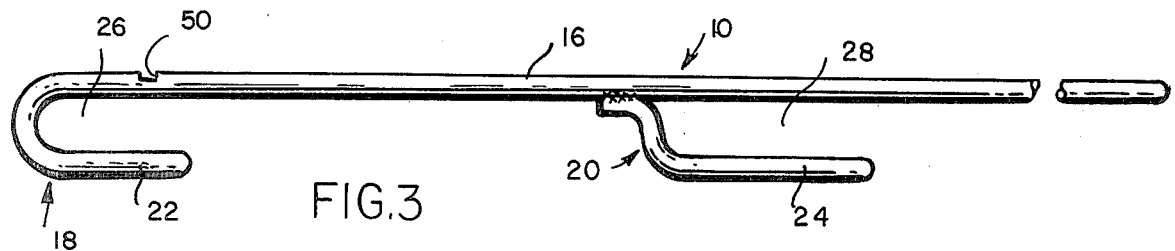
FIG. 3 is an elevation of the lock bar with the locking slider removed.
Figure 4:
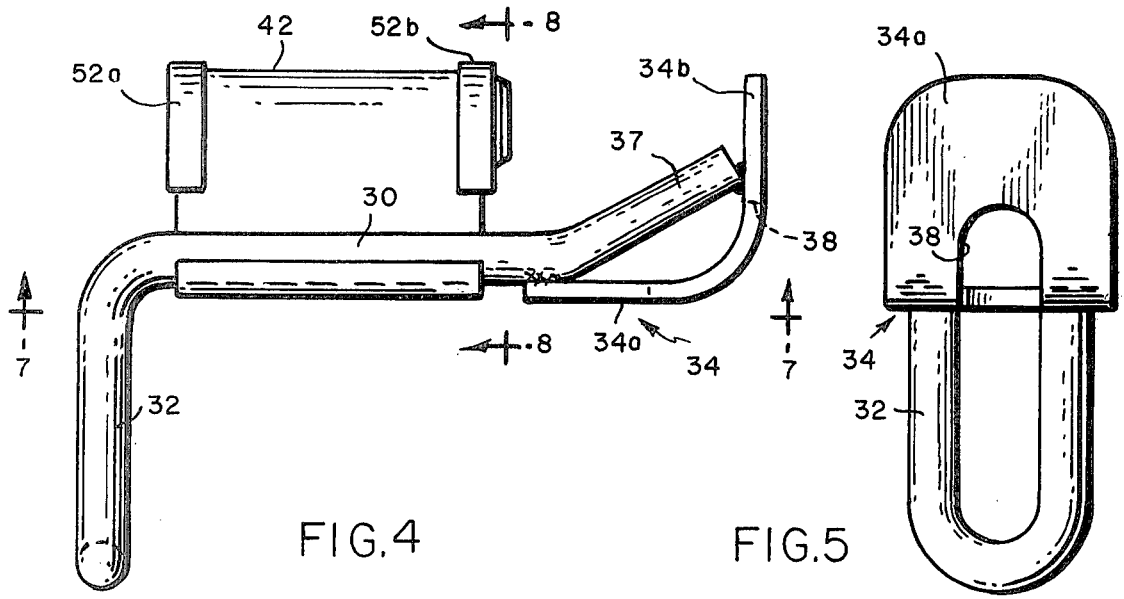
FIG. 4 is an elevation of the locking slider removed from the locking bar.
Figure 5:
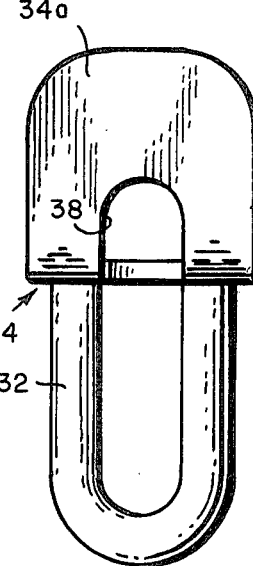
FIG. 5 is a transverse elevation of the locking slider as seen from the right end of FIG. 4.

The bar 10, FIG. 3, comprises a rigid straight shank 16, for example, of circular cross section and two longitudinally spaced hooks 18 and 20 having portions 22 and 24 spaced from and parallel to the shank 16 and defining therewith openings 26 and 28 for receiving the rim of the steering wheel 12. The hooks may face in a direction opposite that shown in FIGS. 2 and 3, or may face toward each other. The hook 18 is an integral portion of the bar bent double upon itself, whereas the hook 20 is a part welded to the bar intermediate its ends.

As will be seen by reference to FIG. 1, at least one end of the bar extends sufficiently beyond the rim of the wheel so that the wheel can be rotated only a limited angular distance without contact of the end of the bar with an interior portion of the vehicle which prevents turning the steering wheel sufficiently to enable driving the vehicle, or with the person of the driver, making it impossible for him to manipulate while remaining in the driving position.

The bar 10 is locked onto the steering wheel by means of the slide 14 which, as illustrated in FIGS. 4 to 7, is comprised of a rod bent to provide spaced parallel portions 30—30 at one end of which there is an integral depending loop 32. The opposite ends 37—37 of the parallel portions 30—30 are bent upwardly and welded to the limbs of an angle member 34 which has right angular disposed limbs 34a,34b. At the junction of the limbs 34a,34b, there is an opening 38 for slidingly receiving the bar so that when the slide 14 is mounted on the bar, the portions 30—30 are situated at opposite sides of the axis of the bar and the loop 32 extends downwardly from the bar to a position for receiving the distal end 40 of the hook 18, as shown in FIG. 2. Movement of the slide along the bar to a position of engagement of the loop with the distal end of the hook confines the rim of the wheel with the hook 18. A flat plate may be substituted for the bent rod bent downwardly at one end and rearwardly at the other and provided with openings in said bent portions for slidingly receiving the shank 16 and shank end 22, FIG. 7A.

The slide includes a saddle 42 which is welded, as shown in FIG. 8, to the portions 30—30 of the slider so as to project upwardly therefrom and which defines a chamber, FIG. 10, parallel to the top side of the bar for receiving the barrel 44 of a conventional lock assembly in a position such that the axis of the keyhole 46 is parallel to the bar and the bolt 48 is perpendicular to the bar. The bar itself is provided with a notch 50 for receiving the bolt 48 when the latter is extended at the locking position of the slide.

At the opposite ends of the saddle, there are caps 52a-52b which, by engagement with the ends of the barrel, prevent its removal. The caps are welded to the open ends of the saddle and the cap 52b contains an opening 52c which provides access to the keyhole, but which prevents the lock cylinder from being removed without breaking the weldment. As a further obstruction to access to the keyhole of the lock by means other than the key which is provided for this purpose such as, for example, tools used to pick a look, the angle member 34 is located close enough to the keyhole opening so that the limb 34b which is directly opposite the keyhole is at a distance slightly more than the length of the key, thus making it difficult to insert an implement directly into the keyhole. The welding of the extremities of the upwardly bent portion 37—37 to the limb 34b prevents the latter from being bent to an out-of-the-way position and also prevents inserting a tool from either side into the keyhole. As a still further deterrent to picking the lock, a ferrule 54 is rotatably set into the opening 52c of the cap 52b containing a slot 58 opposite the keyhole plate. While the slot 58 will admit the key, the ferrule will turn freely when an attempt is made to drill with a larger diameter drill than key width, or to thread an implement into it and so stymy any attempt by screwing an implement into the lock to extract it.

The entire structure is comprised of hardened steel of sufficient gauge so that it cannot be cut with ordinary bolt cutting devices and, desirably, the parts are coated with a layer of resinous or plated material to provide a smooth and attractive appearance.

To facilitate manufacture, coating and assembly, the slide 14 is adapted to be slid along the bar toward the hook 18 at the one end, so as to clear the loop 32 of the hook and then rotated to be disengaged from the distal end of the hook. By thus constructing the device, the bar and the hooks may be readily formed and processed for heat treating, plating and coating independently of the slide and the latter may, in turn, be made independently of the bar and the two parts readily assembled when finished.

The device as described is quite simple in construction and yet is highly effective as a theftproof or tamper-resistant locking device for preventing manipulation of a vehicle sufficiently to enable it to be driven.

It should be understood that the present disclosure is for the purpose of illustration only and includes all modifications or improvements which fall within the scope of the appended claims.

I claim:

1. An antitheft device for attachment to a steering wheel in an automobile comprising a rigid elongated bar of greater length than the diameter of the steering wheel, longitudinally spaced hooks on the bar for engagement with diametrically opposed segments of the steering wheel, one of said hooks being disposed to engage the rim from the outside and the other from the inside, means mounted on the bar for movement thereon to a position to confine the rim within the one of said hooks and means for releasably locking said last-named means in confining position.

2. An antitheft device according to claim 1 wherein the means mounted on the bar for movement therealong to a position to confine the rim within the one hook contains an opening for receiving the distal end of the hook when in said confining position.

3. An antitheft device according to claim 1 wherein said means mounted on the bar for movement therealong to a position to confine the rim within the one hook is a rigid part slidably mounted on the bar embodying a limb perpendicular to the bar containing an opening for receiving the distal end of the hook when moved to said confining position.

4. An antitheft device according to claim 3 wherein the means for releasably locking said rigid part in confining position comprises a lock assembly mounted thereto with its axis parallel to the bar and with its bolt perpendicular to the bar, said lock assembly containing a key-receiving opening and said bar containing a notch for receiving the bolt when extended by the key and a guard device fixed to the part opposite the key-receiving opening at a distance slightly over one key length.

5. An antitheft device according to claim 3 wherein said rigid part embodies a depending loop disposed in a plane at right angles to the plane of said one of said hooks, said loop defining an opening within which the distal end of said one of said hooks becomes engaged when said rigid part is moved to said confining position.

6. A device according to claim 1 wherein said one hook is located at one end of the bar and said other hook intermediate the ends of the bar.

7. A device according to claim 6 wherein the hook at one end of the bar is an integral portion of the bar bent double upon itself and the hook intermediate the ends is welded to the bar.

8. A device according to claim 3 wherein said rigid part comprises a rod bent to provide spaced parallel portions for receiving between them the bar, an angle member fixed to the lower sides of the parallel portions of the rod having a portion for sliding engagement with the lower side of the bar and a portion perpendicular thereto and to the bar, said member containing at the junction of the horizontal and perpendicular portions an opening for slidingly receiving the bar and a saddle fixed to the parallel portions of the rod across the upper side of the bar for receiving a locking assembly in a position such that the barrel of the locking assembly has sliding engagment with the upper side of the bar.

9. A device according to claim 8 wherein the ends of the parallel portions of the rod are bent upwardly and welded to the perpendicular portion of the angular member.

10. A device according to claim 3 wherein said rigid part is slidably removable over the hook at the end of the bar.

* * * * *